US005136787A

United States Patent [19]
Phills

[11] Patent Number: 5,136,787
[45] Date of Patent: Aug. 11, 1992

[54] RULER TEMPLATE FOR COMPUTER KEYBOARD

[75] Inventor: Anthony Phills, Lasalle, Canada

[73] Assignee: Joyce Pillarella, Montreal, Canada; a part interest

[21] Appl. No.: 770,485

[22] Filed: Oct. 3, 1991

[51] Int. Cl.⁵ .............................................. G01B 3/10
[52] U.S. Cl. ...................................... 33/483; 33/494; D14/114
[58] Field of Search ............... 33/483, 489, 492, 493, 33/494; 434/118; D14/114, 115; D10/71; 364/709.1, 709.11

[56] References Cited

U.S. PATENT DOCUMENTS

| | | | |
|---|---|---|---|
| D. 195,278 | 5/1963 | DiPrimio | D10/71 |
| 204,601 | 6/1878 | Perris | 33/494 |
| D. 273,094 | 3/1984 | Clausen et al. | D10/71 |
| D. 294,706 | 3/1988 | Duffin, II | D14/114 |
| 443,652 | 12/1890 | Jewell | 33/483 |
| 1,528,992 | 3/1925 | Rose | D10/71 |
| 3,412,470 | 11/1968 | Williams et al. | 33/494 |
| 4,060,163 | 11/1977 | Willingham | 400/714 |
| 4,935,888 | 6/1990 | Heston et al. | D14/114 |

FOREIGN PATENT DOCUMENTS

| | | | |
|---|---|---|---|
| 0258101 | 11/1986 | Japan | 33/494 |
| 0105114 | 7/1942 | Sweden | 33/494 |

Primary Examiner—Thomas B. Will
Attorney, Agent, or Firm—Larson & Taylor

[57] ABSTRACT

There is disclosed a template for a computer keyboard which provides markings constituting a measurement scale. The template provides an aperture therein to thereby permit keys of the keyboard to pass therethrough. The measurement scale has units of measurement which may be in inches, centimeters, millimeters, Pica units, point sizes and Agate lines.

14 Claims, 4 Drawing Sheets

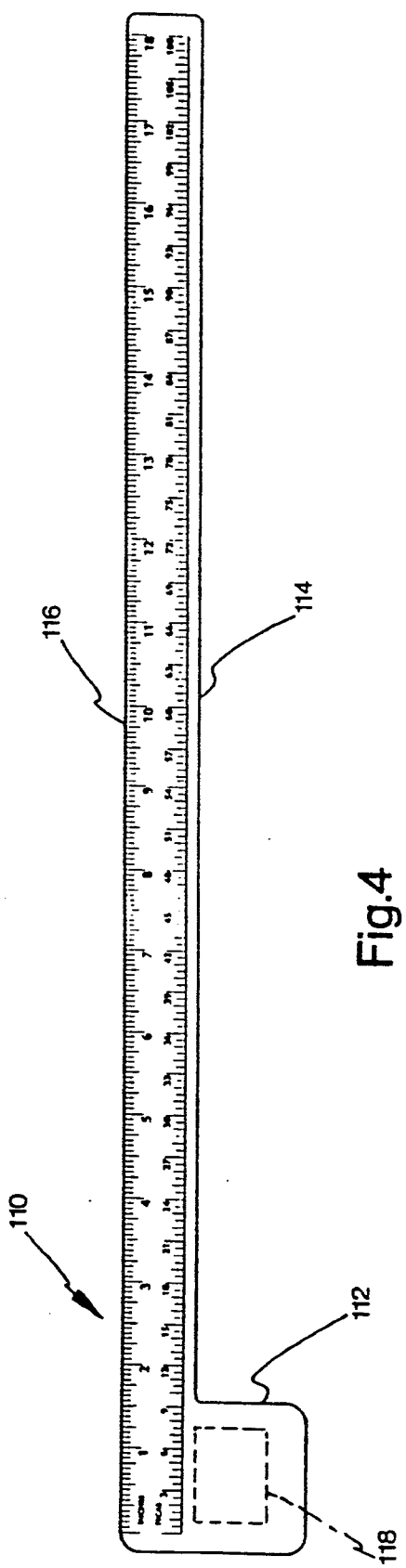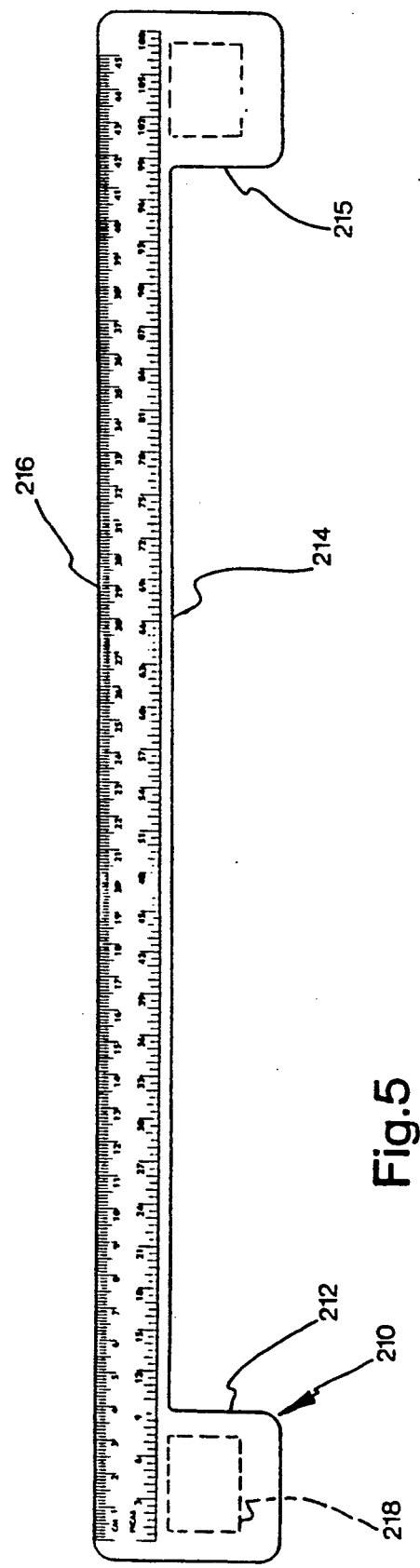

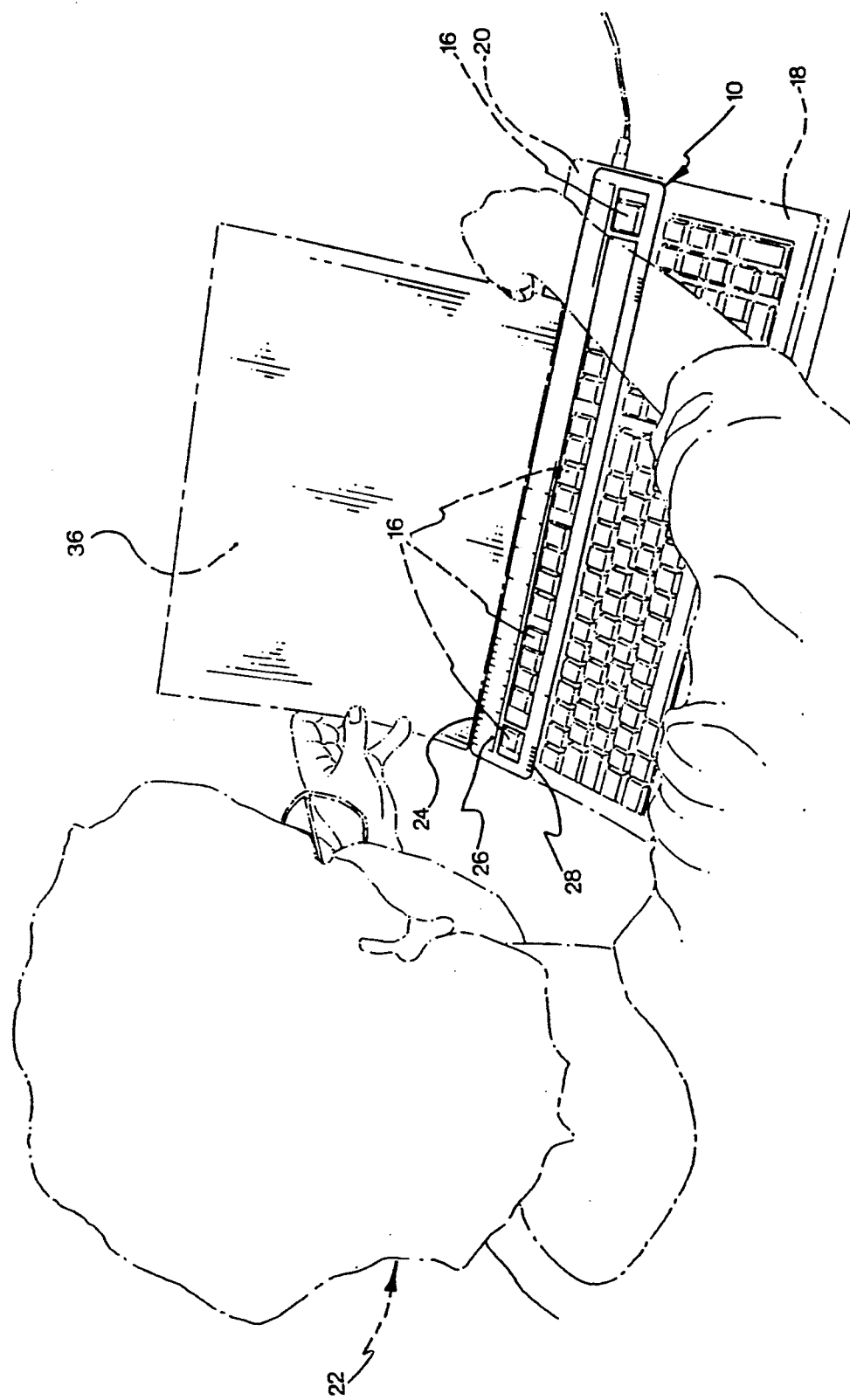

RULER TEMPLATE FOR COMPUTER KEYBOARD

FIELD OF THE INVENTION

The present invention relates generally to computer keyboard templates and more particularly, to a computer keyboard template providing markings which constitute a measurement scale.

BACKGROUND OF THE INVENTION

Personal computers and workstations have become extremely popular and useful devices in the workplace. The acceptance and proliferation of personal computers is to a great extent due to sophisticated software products which make these machines especially useful for specific tasks such as word processing, desktop publishing and graphics applications.

Where a personal computer is used in such fields of activity as desktop publishing, artistic design, newspaper layout design or advertising, it is necessary when working with certain software programs to have a ruler at hand in order to measure artwork, photos, text material and other working documents so that various measurements may be taken from such materials and then entered into the computer by the operator thereof. Typical measurements of working materials that are encountered when using the software programs described above may relate to leading or line spacing, type sizes, newspaper column widths and heights, and the dimensions of photographs or other artwork which are to be incorporated into the main text of a document or layout already entered into the computer.

Although some graphics and desktop publishing software programs provide a ruler or some other measurement scale directly on the computer screen, it is not at all convenient for a person working with such software to bring any working documents up against the computer screen for measurement purposes. Moreover, some computer screens have curved surfaces, such that measurement by way of on-screen rulers may be cumbersome. As well, some computer screens may not be sufficiently large enough to permit convenient on-screen measurements of very long or wide documents and artwork. Finally, in many cases, the on-screen measurement scales generated by a software program may not necessarily be provided to scale. That is, the representation of the measurement scale on the screen may not always correspond identically or on a 1:1 basis with the actual units of measurement in question.

The result of the foregoing difficulties is that many software users and keyboard operators resort to using a conventional ruler for measurement of their working documents. However, such rulers may be easily misplaced or lost, and can be difficult to readily locate, especially in cluttered work environments or where only a limited workspace is available.

It is accordingly an object of the present invention to provide a template for a computer keyboard, which template provides markings constituting a measurement scale. Although the prior art reveals numerous varieties of templates for use with computer keyboards, the prior art templates do not teach or even suggest a template which provides markings constituting a measurement scale. For instance, in U.S. Pat. No. Des. 294,706 issued on Mar. 15, 1988 to one Duffin, II, there is disclosed a personal computer keyboard template for displaying operating instructions for software programs. The template is substantially L-shaped and has an upper portion which extends laterally adjacent the topmost row of keys of the keyboard. The template also has a side portion which extends transversely from the upper portion and provides an aperture therein for allowing keys of the keyboard to pass therethrough. The Duffin patent does not, however, even suggest the provision of a measurement scale on the template.

In U.S. Pat. No. 4,060,163 issued on Nov. 29, 1977 in the name of Willingham, there is taught a keyboard guard for protecting the keys of a keyboard from being inadvertently activated. The guard provides an aperture therein for accommodating keys of the keyboard. Although it is taught that the guard may be provided with indicia on the surface thereof, such markings are disclosed to be for providing informative data respecting the particular keys of the keyboard. There is therefore no teaching or even a remote suggestion by Willingham of a keyboard template which provides markings constituting a measurement scale.

In yet another example of known keyboard templates, namely that of U.S. Pat. No. 4,935,888 issued on Jun. 19, 1990 in the names of Heston et al., there is disclosed a template which employs a tray device capable of being disposed in juxtaposition to the keyboard keys. There is no suggestion whatsoever by Heston et al. of the provision of markings constituting a measurement scale on a computer keyboard template.

SUMMARY OF THE INVENTION

The present invention overcomes the inconveniences and shortcomings discussed above and associated with the use of a conventional ruler with computer software which requires the user thereof to routinely make measurements of working documents.

According to a broad aspect of the present invention, there is provided a template for a keyboard, the template providing markings which constitute a measurement scale and means to assist in retaining said template against keys of the keyboard, the template being so dimensioned that said measurement scale is disposed immediately adjacent an edge of the keyboard, whereby an object may be brought proximate to said edge of the keyboard in order to be measured with the aid of said measurement scale.

According to preferred embodiments of the present invention, the template provides first and second edges thereof, said edges each being substantially transversely disposed the one to the other to thereby assist in retaining said template on said keyboard by positioning said edges in contact with at least a portion of keys of the keyboard.

With reference to further preferred embodiments, a third edge may be provided on the template, the third edge being substantially transversely disposed to the first edge and substantially parallel to the second edge of the template. Such a configuration is useful in allowing the template to be disposed on the keyboard and retained thereon by straddling one or more rows of keys.

Preferably, a fourth edge is provided on the template, such that the four edges of the template form an aperture to thereby permit keys of the keyboard to pass therethrough. The use of an aperture in the template rather than or in addition to the provision of two or three edges thereon, provides for a more secure positioning of the template on the keyboard. This is because the template will be more difficult to dislodge if it completely surrounds a portion of the keyboard by accommodating keys thereof through its aperture.

The template may provide units of measurement such as inches, centimeters, millimeters, Pica units, point sizes and Agate lines. Preferably, the template is substantially opaque and provides a plurality of such measurement scales on each of the two planar surfaces of the template.

In the most preferred configuration, the first planar surface of the template provides markings thereon which constitute measurement scales in units of inches, Pica units and Agate lines, and wherein the second planar surface thereof provides markings thereon which constitute measurement scales in units of centimeters, Pica units and Agate lines.

Where the template according to the present invention provides an aperture therein, it is preferable for this aperture to constitute means for disposing the template immediately adjacent an upper edge of the computer keyboard when such a keyboard is positioned for use by an operator thereof. This will make it possible and easier for measurements of working documents to be taken without having to lift the template from the computer keyboard, since the documents may be brought up against the edge of the computer keyboard adjacent to which the template will be disposed.

The computer template according to the present invention is amenable to manufacture in a substantially flexible form, if desired. Preferably, the template is composed of a plastic material.

BRIEF DESCRIPTION OF THE DRAWINGS

For purposes of illustration, but not of limitation, preferred embodiments of the present invention are described hereinbelow with reference to the following drawings in which:

FIG. 4 is a top plan view of a second embodiment of the computer keyboard template according to the present invention, which provides two edges to assist in retaining the template against keys of the keyboard on which it is to be placed;

FIG. 5 is a third embodiment of the computer keyboard template according to the present invention, having a third edge thereof;

FIG. 6 is a perspective representation of the computer keyboard template of FIGS. 1 to 3, disposed on a computer keyboard immediately adjacent an upper edge thereof and showing the measurement of a working document without lifting the template from the keyboard.

DETAILED DESCRIPTION OF PREFERRED EMBODIMENTS

Figure 1:
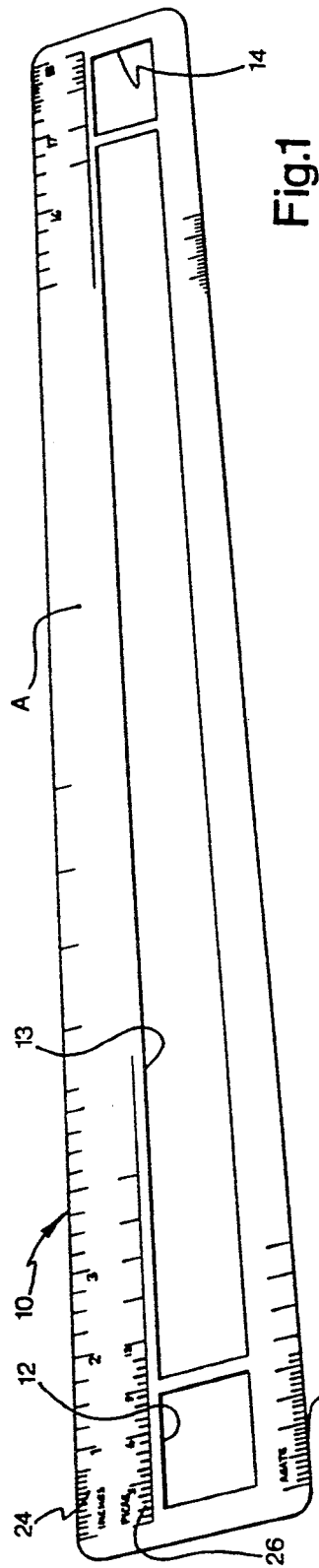
FIG. 1 is a perspective view of the computer keyboard template according to a first embodiment of the present invention, showing three measurement scales schematically represented on a side thereof.
Figure 2:
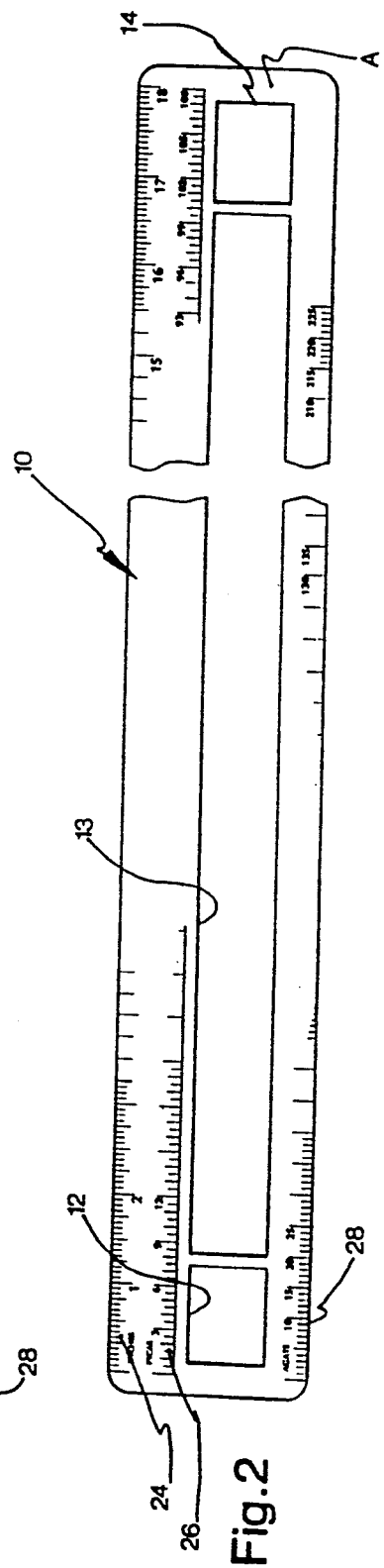
FIG. 2 is a top plan view of a first planar surface of the template of FIG. 1.
Figure 3:
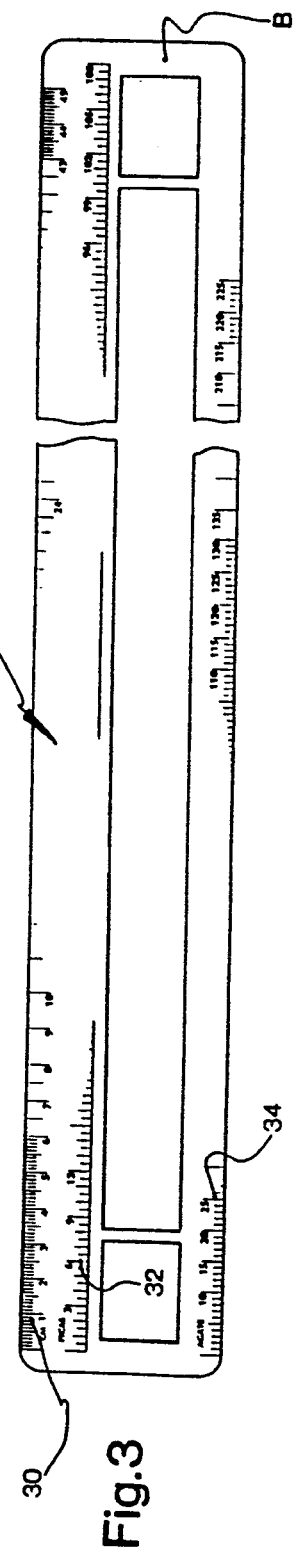
FIG. 3 is a top plan view of a second planar surface of the template of FIG. 2, showing further measurement scales being provided thereon.

With reference to the drawings, there is shown in FIGS. 1 to 3 a template 10 in accordance with the present invention. The template 10 has apertures 12,13,14 therein to thereby permit the keys 16 of a keyboard 18 to pass therethrough, as best shown in FIG. 6. The template 10 is preferably elongate and provides at least one aperture 12,13 or 14 therein.

The apertures 12,13,14 of the template 10 allow for the template to be retained by the keys 16 of keyboard 18, the template preferably being disposed immediately adjacent an upper edge 20 of the keyboard 18 when the keyboard is positioned for use by an operator 22 thereof, as best shown in FIG. 6.

As it is depicted in FIGS. 1 to 3, the template is preferably substantially opaque and provides markings 24,26,28 on a first planar surface A thereof, which markings constitute any combination of desired measurement scales. On the second planar surface B of the template 10, further measurement scales 30,32,34 are provided. This allows for the template 10 to be reversible in nature and provide a convenient number of different measurement scales.

In the embodiment of the template 10 shown in FIGS. 1 to 3, the specific measurement scales of planar surface A are those of inches 24, Pica units 26 and Agate lines 28. In the case of planar surface B of the template 10, the units of measurement are provided in centimeters 30, Pica units 32 and Agate lines 34. Those skilled in this art will appreciate that any other desired units of measurement may be provided on the surfaces A and B of the template 10. For instance, it may be convenient to provide units of typesetting points, which are common units of measurement of character height in the field of printing. Where Agate lines are selected as a unit of measurement for the template 10, it is preferable that the length of the template 10 be at least 225 Agate lines in length, this measure corresponding to the maximum length of commonly available tabloid newspapers.

Turning now to FIG. 4, there is shown a second embodiment of a computer keyboard template 110. The template 110 provides first and second edges 112,114 thereof, said edges each being substantially transversely disposed the one to the other. Markings 116, constituting any desired combination of measurement scales, are also provided on each of the planar surfaces of the template 110 as was discussed above for the template 10.

The first and second edges 112,114 of the template 110 assist in retaining the template against keys of a keyboard on which it is to be placed. The retention of the template 110 on the keyboard is further enhanced by the provision of an aperture for allowing a portion of the keyboard keys therethrough, such as the aperture denoted by the reference numeral 118.

With reference to FIG. 5, there is shown a third embodiment of a computer keyboard template 210 having a first edge 212, a second edge 214 substantially transversely disposed to the latter, and a third edge 215 which is substantially parallel to the first edge 212 and substantially transversely disposed to the second edge 214. The template 210, like the template 10 and 110, also provides markings 216 thereon which constitute measurement scales.

The three edges 212,214,215 of the template 210 assist in retaining the template 210 against a portion of keys of the keyboard on which it is to be placed. The template 210, by the provision of three edges for abutment against keyboard keys, provides for more secure placement on the keyboard than the template 110, since the latter only provides two such edges for abutment. If desired, and as is the case for the template 110 described above, the template 210 may be provided with an aperture 218 for accommodating keyboard keys. The aperture 218, like aperture 118 of the template 110, will largely prevent the template from being dislodged from the keyboard accidentally, unless the template is lifted upwardly from the keyboard by the user thereof.

Figure 7:
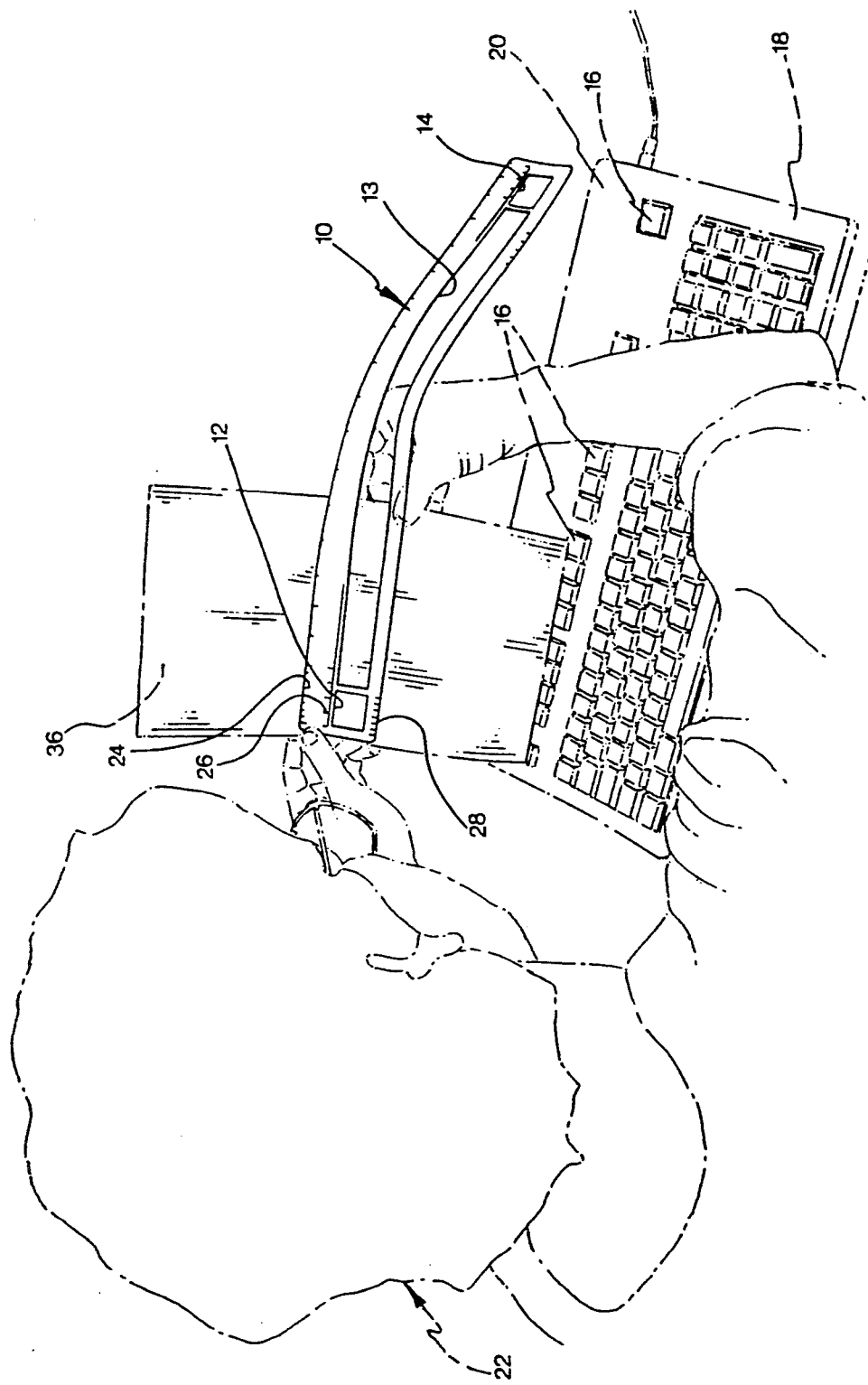
FIG. 7 is another perspective representation of the computer keyboard template of FIG. 6, wherein the template has been lifted from the keyboard in order to measure a working document.

Turning now to FIGS. 6 and 7, the use of template 10 is shown. In FIG. 6, template 10 is left in position on an upper row of keys 16 of keyboard 18, such that the template is positioned immediately adjacent an upper edge 20 of the keyboard. In this way, the user 22 may place a working document 36 up against the edge 20 of the keyboard 18 in order to take a measurement from one of the scales 24, 26 or 28 of the template. Alternatively, and as shown in FIG. 7, the template 10 may be lifted off from the keyboard 18 to measure the document 36 as one would with a conventional ruler. When use of the template 10 has been completed, it is returned to its original position on the keyboard 18 where the user 22 thereof will continue to have ready and convenient access to it.

Those skilled in this art will readily appreciate that various modifications of detail can be made to the present invention, all of which would come within its spirit and scope.

What I claim as my invention is as follows:

1. A template for a keyboard, the template providing markings which constitute a measurement scale and means to assist in retaining said template against keys of the keyboard, the template being so dimensioned that said measurement scale is disposed immediately adjacent an edge of the keyboard, whereby an object may be brought proximate to the said edge of the keyboard in order to be measured with the aid of said measurement scale.

2. The template as defined in claim 1, wherein said means for retaining comprises first and second edges of the template, said edges each being substantially transversely disposed the one to the other to thereby assist in retaining said template on said keyboard by positioning said edges in contact with keys of the keyboard.

3. The template as defined in claim 2, wherein a third edge is provided on the template, said third edge being substantially transversely disposed to the first edge and substantially parallel to the second edge of the template.

4. The template as defined in claim 3, wherein a fourth edge is provided on the template, said four edges forming an aperture in said template to thereby permit keys of said keyboard to pass therethrough.

5. The template as defined in claim 4, wherein said template provides markings in units of inches.

6. The template as defined in claim 4, wherein the template provides markings in units of centimeters.

7. The template as defined in claim 4, wherein the template provides markings in units of Agate lines.

8. The template as defined in claim 4, wherein said template provides markings in Pica units.

9. The template as defined in claim 4, wherein said measurement scale has units of measurement which are selected from the group comprising: inches, centimeters, millimeters, Pica units, point sizes and Agate lines.

10. The template as defined in claim 9, wherein said template provides a plurality of measurement scales having said units of measurement.

11. The template as defined in claim 10, wherein said template is substantially opaque and provides said markings on each of two planar surfaces of the template.

12. The template as defined in claim 11, wherein a first planar surface of the template provides markings thereon constituting measurement scales in units of inches, Pica units and Agate lines, and wherein a second planar surface thereof provides markings thereon which constitute measurement scales in units of centimeters, Pica units, and Agate lines.

13. The template as defined in claim 12, wherein said template is substantially flexible.

14. The template as defined in claim 13, wherein said template is composed of a plastic.

* * * * *